(12) United States Patent
Gill

(10) Patent No.: US 6,621,665 B1
(45) Date of Patent: Sep. 16, 2003

(54) RESETTABLE DUAL PINNED SPIN VALVE SENSOR WITH THERMAL STABILITY AND DEMAGNETIZING FIELDS BALANCED BY SENSE CURRENT AND FERROMAGNETIC FIELDS

(75) Inventor: Hardayal Singh Gill, Portala Valley, CA (US)

(73) Assignee: International Business Machines Corporation, Armonk, CA (US)

( * ) Notice: Subject to any disclaimer, the term of this patent is extended or adjusted under 35 U.S.C. 154(b) by 402 days.

(21) Appl. No.: 09/684,444

(22) Filed: Oct. 6, 2000

(51) Int. Cl.[7] ................................................. G11B 5/39
(52) U.S. Cl. .................................. 360/324.11; 360/314
(58) Field of Search ............................. 360/324, 324.1, 360/324.11, 324.12, 324.2, 314

(56) References Cited

U.S. PATENT DOCUMENTS

| | | | | |
|---|---|---|---|---|
| 5,768,069 | A | * | 6/1998 | Mauri ........................ 360/314 |
| 6,118,622 | A | | 9/2000 | Gill |
| 6,175,475 | B1 | * | 1/2001 | Lin et al. ............... 360/324.11 |
| 6,219,209 | B1 | * | 4/2001 | Gill ........................ 360/324.11 |
| 6,252,750 | B1 | | 6/2001 | Gill ........................ 360/324.11 |
| 6,271,997 | B1 | * | 8/2001 | Gill ............................. 360/314 |
| 6,317,297 | B1 | * | 11/2001 | Tong et al. ................. 360/314 |
| 6,381,105 | B1 | * | 4/2002 | Huai et al. .................. 360/314 |

OTHER PUBLICATIONS

U.S. patent app. 09/684252 filed Oct. 6, 2000 by Gill.
U.S. patent app. 09/458581, filed Dec. 9, 1999 by Pinarbasi.

* cited by examiner

Primary Examiner—David L. Ometz
(74) Attorney, Agent, or Firm—Ervin F. Johnston

(57) ABSTRACT

A dual spin valve sensor is provided with a triple AP pinned layer structure on one side of a free layer and a single pinned layer on an opposite side of the free layer for increasing the flexibility in properly biasing the magnetic moment of the free layer. In one embodiment a negative ferromagnetic coupling field may be provided for still further increasing the flexibility of biasing the free layer. In another embodiment the triple AP pinned layer structure may be provided with no demagnetizing field and in still a further embodiment the triple AP pinned layer structure may be provided with a demagnetizing field as desired for still further increasing the flexibility in biasing the free layer.

35 Claims, 8 Drawing Sheets

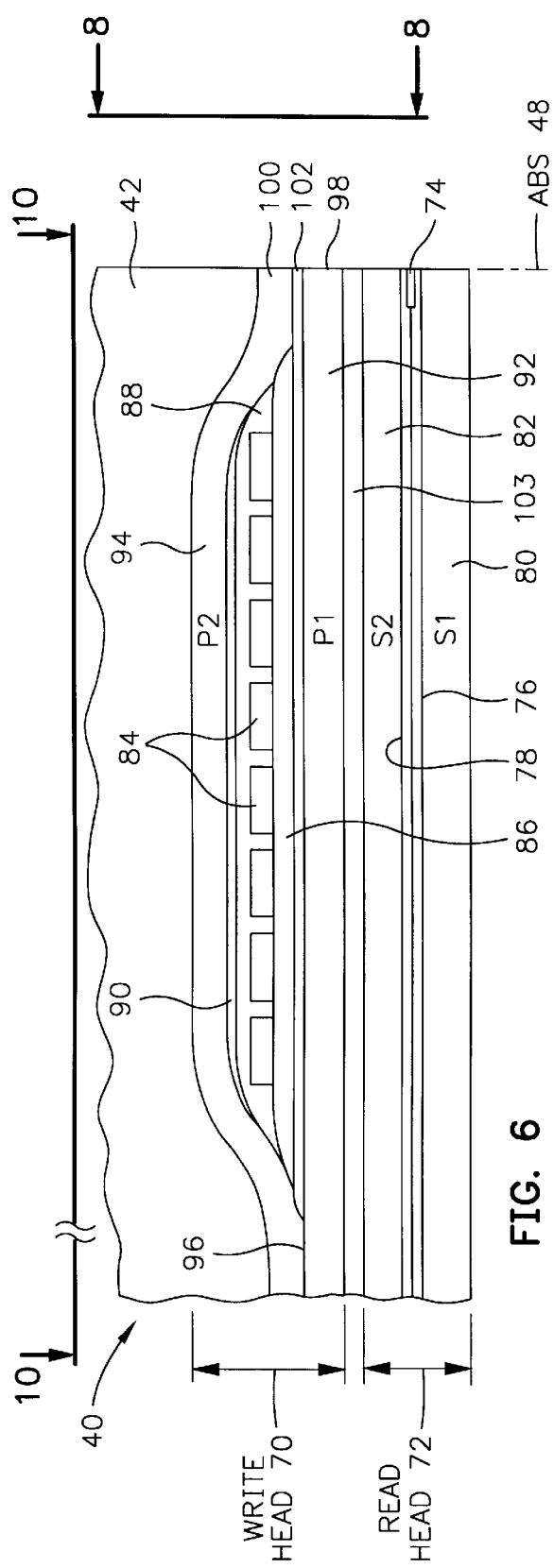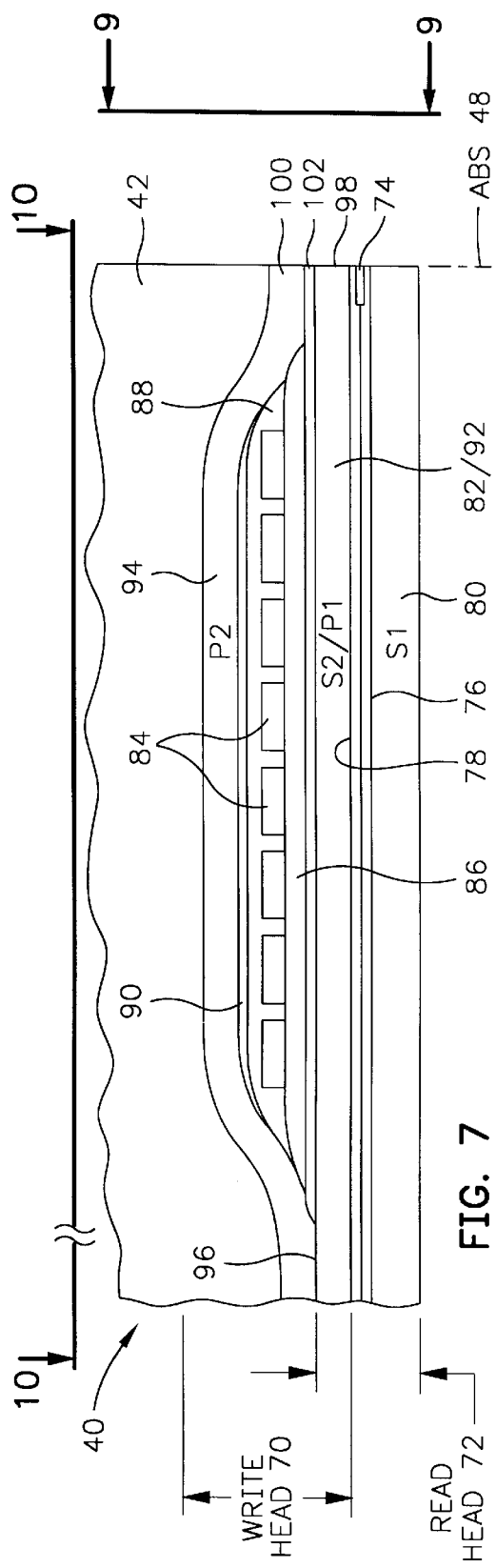

(ABS)

RESETTABLE DUAL PINNED SPIN VALVE SENSOR WITH THERMAL STABILITY AND DEMAGNETIZING FIELDS BALANCED BY SENSE CURRENT AND FERROMAGNETIC FIELDS

BACKGROUND OF THE INVENTION

1. Field of the Invention

The present invention relates to a resettable dual pinned spin valve sensor with thermal stability and demagnetizing fields balanced by sense current and ferromagnetic fields and, more particularly, to such a sensor which has a triple antiparallel (AP) pinned layer structure on one side of a free layer and a single pinned layer on the other side of the free layer.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry, which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor are a function of $\cos\theta$, where $\theta$ is the angle between the magnetic moments of the pinned and free layers. When a sense current is conducted through the spin valve sensor, resistance changes cause potential changes that are detected and processed as playback signals from the rotating magnetic disk.

The sensitivity of the spin valve sensor is quantified as magnetoresistance or magnetoresistive coefficient $dr/R$ where $dr$ is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

The transfer curve for a spin valve sensor is defined by the aforementioned $\cos\theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnitizing (demag) field $H_D$ from the pinned layer, a sense current field $H_1$ from all conductive layers of the spin valve except the free layer, a net image current field $H_{1M}$ from the first and second shield layers. The strongest magnetic force on the free layer structure is the sense current field $H_1$. In an exemplary bottom spin valve sensor where the free layer is closer to the second gap layer than it is to the first gap layer the majority of the conductive layers are below the free layer structure between the free layer structure and the first gap layer. The amount of conductive material in this region is further increased if the pinning layer is metal, such as platinum manganese (PtMn), instead of an oxide, such as nickel oxide (NiO). When the sense current is conducted through the sensor the conductive layers below the free layer structure cause a sense current field on the free layer structure which is minimally counterbalanced by a typical cap layer made of tantalum (Ta) on top of the free layer structure.

A dual spin valve sensor may be employed for increasing the magnetoresistive coefficient dr/R of a read head. In a dual spin valve sensor first and second pinned layers are employed with a first spacer layer between the first pinned layer and the free layer and a second spacer layer located between the second pinned and the free layer. With this arrangement the spin valve effect is additive on each side of the free layer to increase the magnetoresistive coefficient dr/R of the read head.

It should be noted that the magnetic moments of the pinned layers on each side of the free layer must be parallel with respect to one another in order for the spin valve effects on each side of the free layer to be additive. With this arrangement the demagnetizing fields from the pinned layer on each side of the free layer will be additive and that the ferromagnetic coupling fields, due to the interfacing of the AP pinned layers with the spacer layer, will likewise be additive. Since the net demagnetizing field and the net ferromagnetic coupling field are additive the total of these fields must be counterbalanced by the net sense current field due to the conductive layers on each side of the free layer. Even though the net sense current field is the largest field acting on the free layer, it may not be sufficient to counterbalance both of the net demagnetizing field and the net ferromagnetic coupling field in order to obtain read signal symmetry. Help can be obtained for the net sense current field by offsetting the free layer with respect to the first and second shields so that a net image current field is parallel to the sense current field. However, it is preferable to avoid this offset since one of the read gap layers may have to be thicker in order to properly insulate the spin valve sensor from one or both of the shield layers and/or insulate lead layers to the sensor from the second shield layer. Another alternative is to reduce the net demag field by employing AP pinned layer structures in lieu of pinned layers in a dual spin valve sensor. An AP pinned layer structure has an antiparallel coupling (APC) layer which is located between ferromagnetic first and second AP pinned layers. The first and second AP pinned layers have magnetic moments which are antiparallel with respect to one another because of the strong antiferromagnetic coupling therebetween. Because of a partial flux closure between the first and second AP pinned layers of each of the first and second AP pinned layer structures, each AP pinned layer structure exerts only a small demagnetizing field on the free layer. The AP pinned layer structure is fully described in commonly assigned U. S. Pat. No. 5,465,185 which is incorporated by reference herein. An AP pinned layer structure on each side of the free layer may not be practical where a thin read gap is desired for increasing the linear read bit density of the read head. An AP pinned layer structure has more layers than a pinned layer which increases the thickness of the spin valve sensor thereby increasing the thickness of the read gap. Accordingly, there is a strong-felt need to obtain more flexibility in counterbalancing the fields exerted on the free layer in a dual spin valve sensor.

SUMMARY OF THE INVENTION

The present invention provides more flexibility in counterbalancing the fields acting on the free layer by providing a triple AP pinned layer structure on one side of the free layer and a simple pinned layer on the other side of the free layer. The triple AP pinned layer structure has ferromagnetic first, second and third AP pinned layers and first and second AP coupling layers with the second AP pinned layer being located between the first and second AP coupling layers and the first and second AP coupling layers being located between the first and third AP pinned layers. Accordingly, the first AP pinned layer interfaces and is exchange coupled to the first pinning layer and the third AP pinning layer interfaces the first spacer layer. In a first embodiment of the invention the AP pinned layer structure exerts no demagnetizing field on the free layer. This is accomplished by providing the second AP pinned layer with a magnetic thickness which is equal to a total of the magnetic thicknesses of the first and third AP pinned layers. In this embodiment the only demagnetizing field exerted on the free layer is due to the pinned layer on the other side of the free layer. In this embodiment a setting of the magnetic spins of the first and second pinning layers is accomplished by an exterior magnetic field in the presence of heat which is sufficient to free the magnetic spins so that they can be moved by the exterior magnetic field. In a second embodiment the magnetic thickness of the second AP pinned layer of the AP pinned layer structure has a magnetic thickness which is greater than a total of the magnetic thicknesses of the first and third AP pinned layers. With this embodiment a current pulse can be conducted through the sensor via the sense current circuit for resetting the magnetic spins of the first and second pinning layers.

Further flexibility in counterbalancing the fields may be accomplished by providing a negative ferromagnetic coupling field on the side of the free layer where the triple AP pinned layer structure is located. This is accomplished by providing a first pinning layer which is composed of platinum manganese (PtMn) and providing particular seed layers for the platinum manganese (PtMn) pinning layer. With this arrangement an appropriately sized first spacer layer will cause the third AP pinned layer next to the first spacer layer to exert a negative ferromagnetic coupling field on the free layer. In all embodiments the net demagnetizing field is counterbalanced by the net sense current field and the net ferromagnetic coupling field.

An object of the present invention is to provide a dual spin valve sensor wherein there is more flexibility in counterbalancing the fields acting on the free layer so as to obtain read signal symmetry.

Another object is to accomplish the foregoing objective as well as minimizing the read gap in order to maximize linear read bit density of the read head.

A further object is to accomplish the foregoing objectives and provide a negative ferromagnetic coupling field when needed in order to obtain read signal symmetry.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
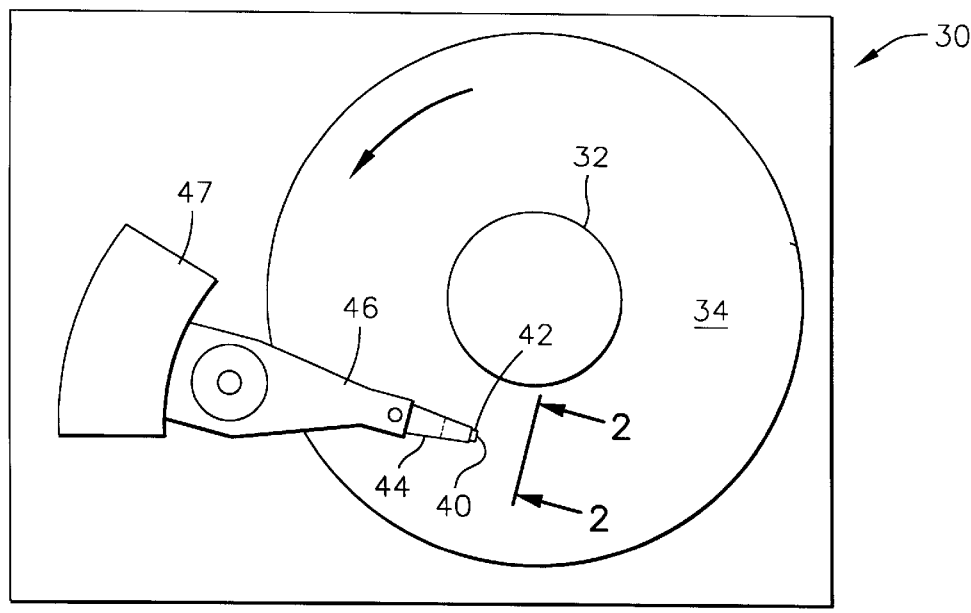
FIG. 1 is a plan view of an exemplary magnetic disk drive.
Figure 2:
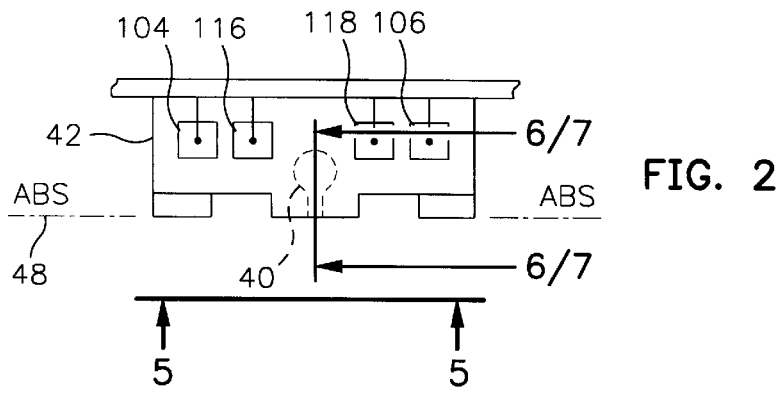
FIG. 2 is an end view of a slider with a magnetic head of the disk drive as seen in plane 2—2 of FIG. 1.
Figure 3:
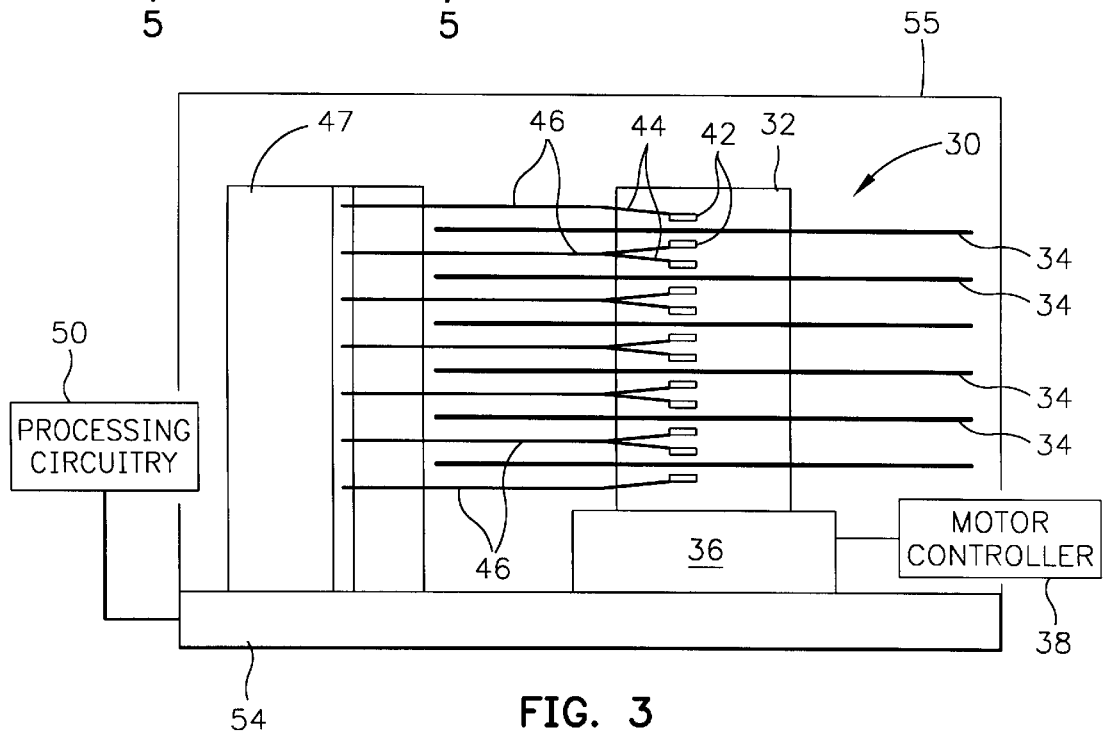
FIG. 3 is an elevation view of the magnetic disk drive wherein multiple disks and magnetic heads are employed.
Figure 4:
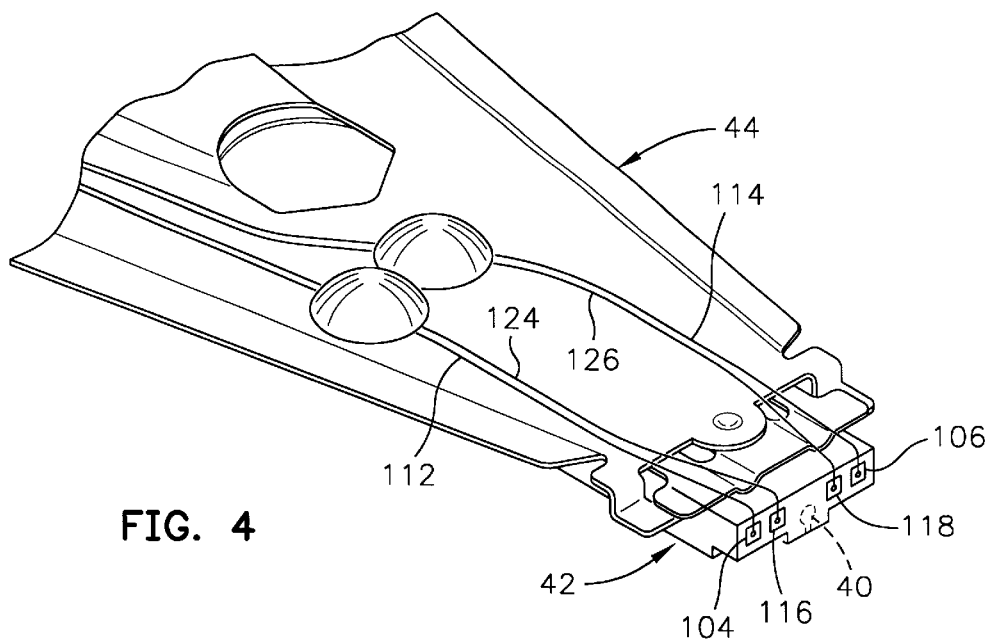
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
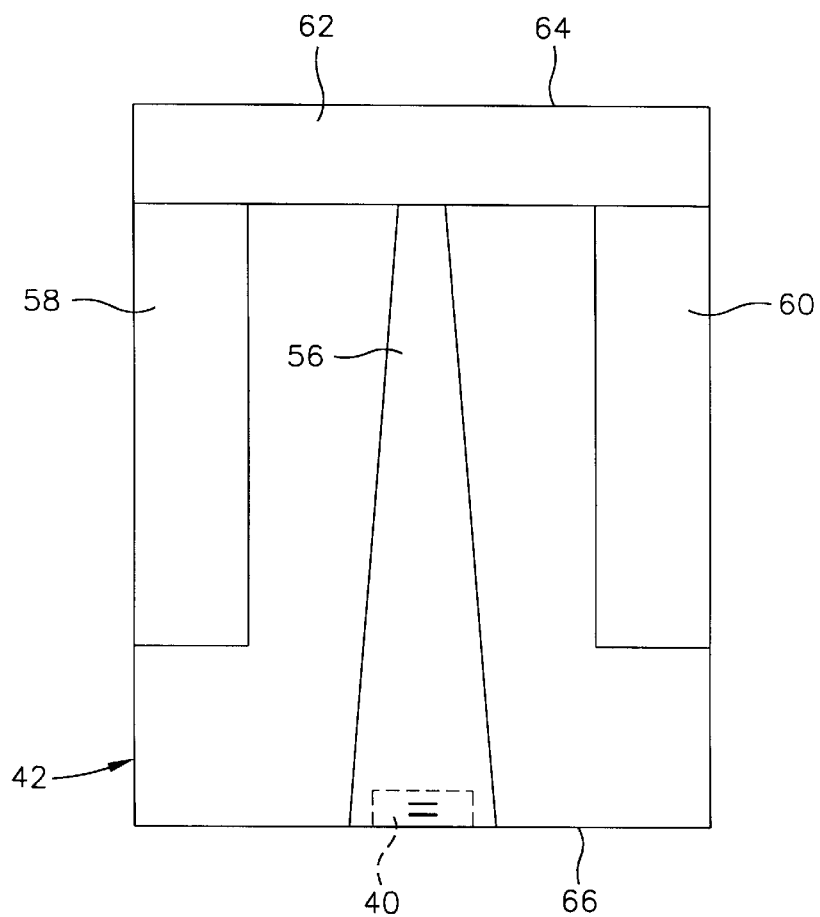
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
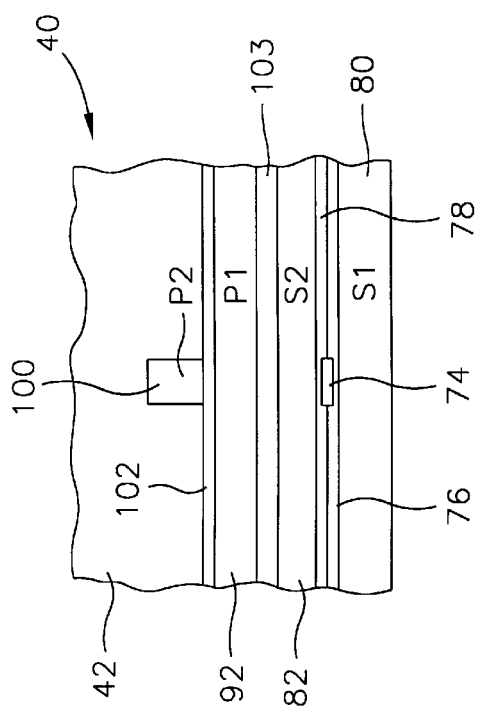
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
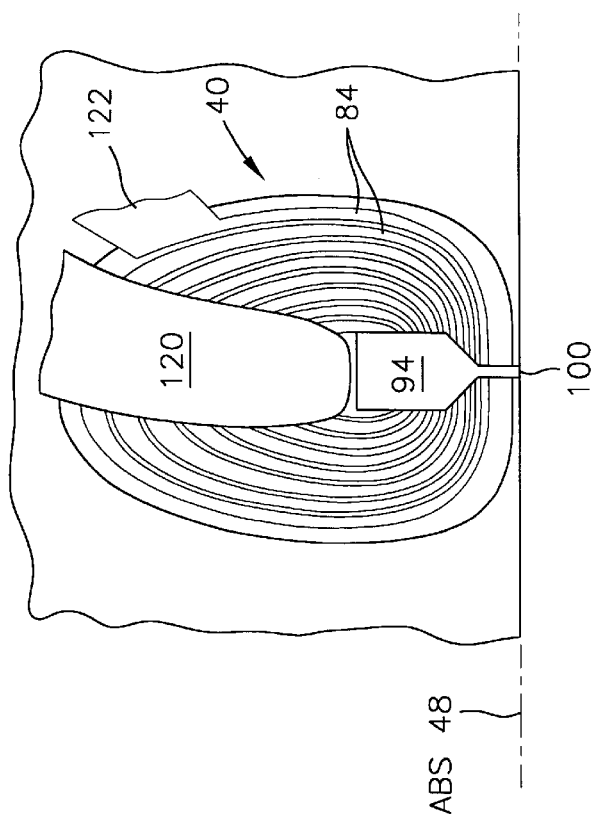
FIG. 10 is a view taken along plane 10—10 of FIG. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
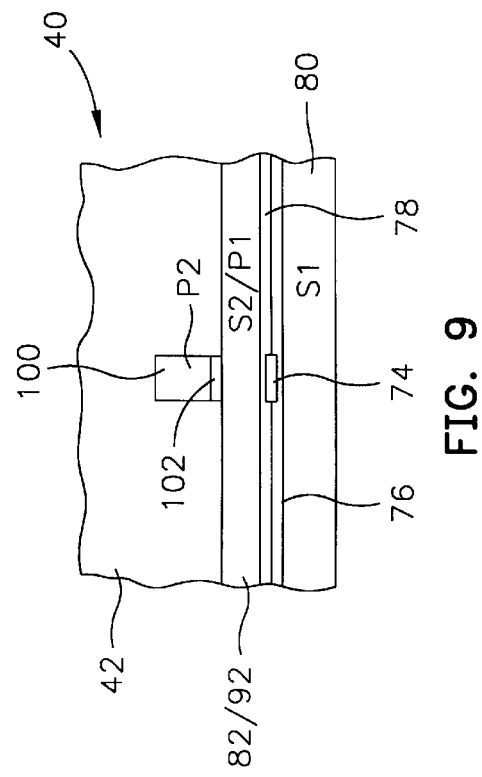
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
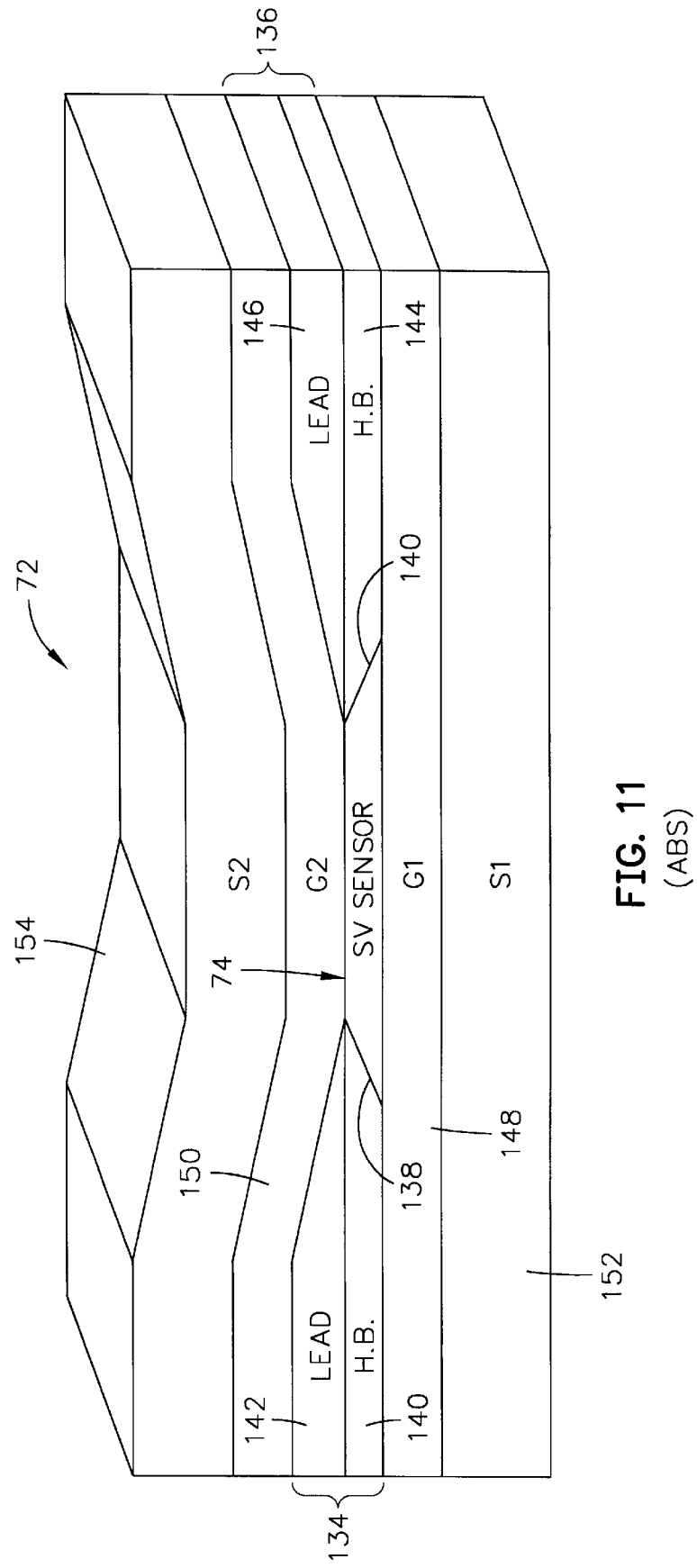
FIG. 11 is an enlarged isometric illustration of a read head which has the present dual spin valve sensor.

FIG. 11 is an isometric ABS illustration of the read head 72 shown in FIGS. 6 or 8. The read head 72 includes the present dual spin valve sensor 74. First and second hard bias and lead layers 134 and 136 are connected to first and second side edges 138 and 140 of the spin valve sensor. This connection is known in the art as a contiguous junction and is fully described in commonly assigned U. S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
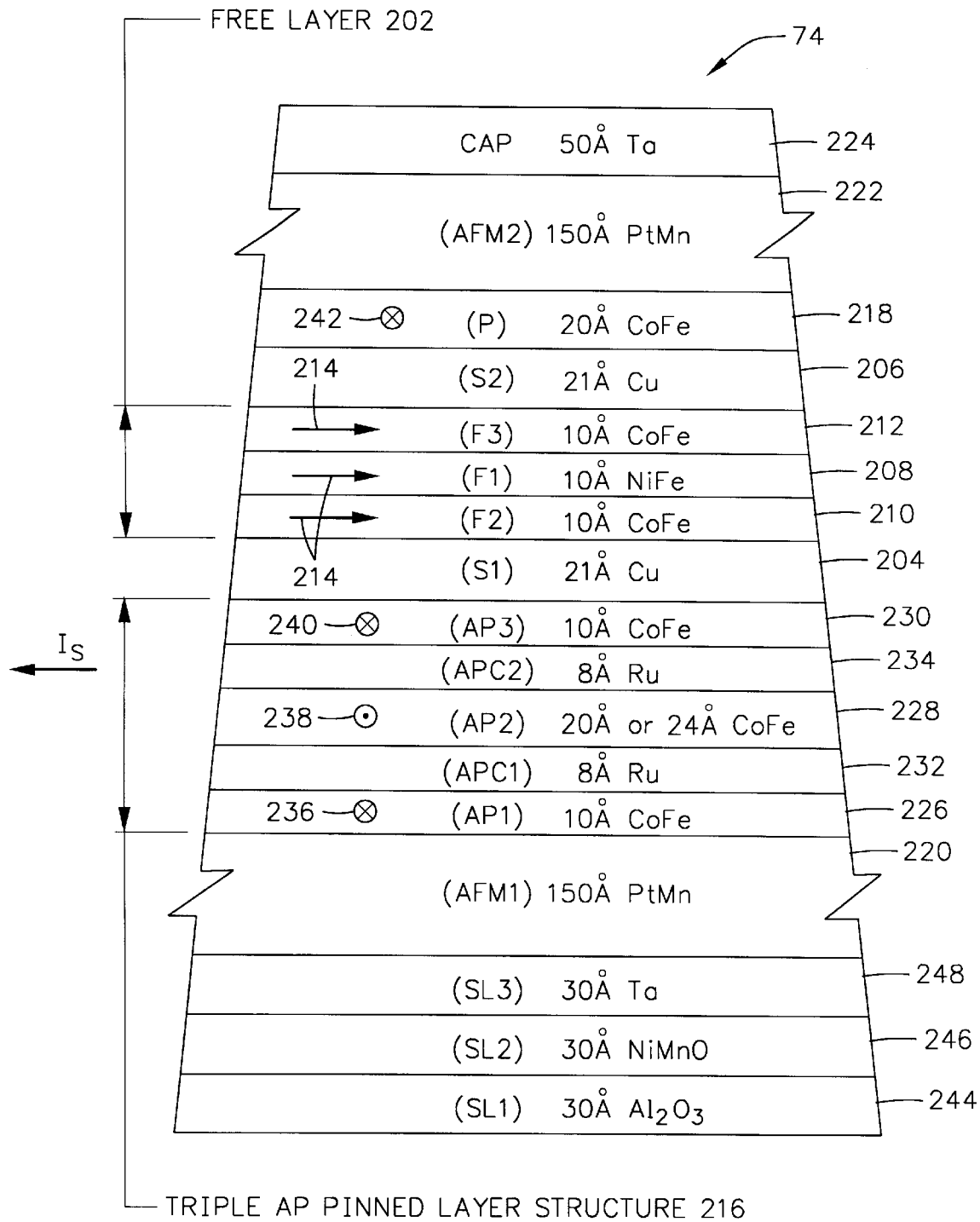
FIG. 12 is an ABS illustration of the present dual spin valve sensor.

An ABS illustration of the present dual spin valve sensor 74 is illustrated in FIG. 12. The sensor 74 includes a ferromagnetic free layer 202 which is located between nonmagnetic electrically conductive first and second spacer layers (S1 and S2) 204 and 206. The free layer 202 may include first, second and third free films (F1, F2 and F3) 208, 210 and 212 wherein the first free film 208 is 10 521 of nickel iron (NiFe) and each of the second and third free films 210 and 212 are 10 521 of cobalt iron (CoFe). These thicknesses are exemplary and can be varied as desired. It has been found that the cobalt iron (CoFe) free films 210 and 212 next to copper (Cu) spacer layers 204 and 206 increase the magnetoresistive coefficient dr/R of the spin valve sensor. The first free film 208 of nickel iron (NiFe) promotes magnetic softness of the free layer. An exemplary thickness and material for each of the spacer layers 204 and 206 is 21 Å of copper (Cu). The free layer 202 has a magnetic moment 214 which is parallel to the ABS and is directed from right to left or from left to right, as shown in FIG. 12. When the magnetic moment 214 is parallel to the ABS there is read signal symmetry and when the magnetic moment 214 is not parallel to the ABS there is read signal asymmetry.

The first and second spacer layers 204 and 206 are located between a triple AP pinned layer structure 216 and a simple (single) pinned layer (P) 218. The triple AP pinned layer structure 216 is exchange coupled to a first antiferromagnetic layer (AFM 1) 220 for pinning magnetic moments of the triple AP pinned layer structure 216 and the pinned layer 218 is exchange coupled to a second antiferromagnetic pinning layer (AFM2) 222 for pinning the magnetic moment of the pinned layer 218, which will be discussed in more detail hereinafter. A cap layer 224, which may be 50 Å of tantalum (Ta), is located on the second pinning layer 222 for protecting the second pinning layer from subsequent processing steps in the fabrication of the read head.

The triple AP pinned layer structure 216 includes first, second and third AP pinned layers (AP1, AP2 and AP3) 226, 228 and 230 and first and second antiparallel coupling layers (APC1 and APC2) 232 and 234. The second AP pinned layer 228 is located between the first and second antiparallel coupling layers 232 and 234 and the first and second antiparallel coupling layers are located between the first and third AP pinned layers 226 and 230.

The first AP pinned layer 226 interfaces the first pinning layer 220 and has a magnetic moment 236 which is pinned by the pinning layer perpendicular to the ABS in a direction out of the sensor or into the sensor, as shown in FIG. 12. By strong antiparallel coupling layer between the first and second AP pinned layers 226 and 228 a magnetic moment 238 of the second AP pinned layer is antiparallel to the magnetic moment 236 and again, by strong antiparallel coupling between the second and third AP pinned layers 228 and 230, a magnetic moment 240 of the third AP pinned layer 230 is antiparallel to the magnetic moment 238. In the present invention the pinned layer 218 has a magnetic moment 242 which is pinned by the pinning layer 222 perpendicular to the ABS and parallel to the magnetic moment 240. It is necessary that the magnetic moments 240 and 242 be parallel (in-phase) so that the spin valve effects on each side of the free layer 202 are additive. Accordingly, if a signal field from a rotating magnetic disk rotates the magnetic moment 214 of the free layer upwardly into the sensor the magnetic moment 214 becomes more parallel with respect to the magnetic moments 240 and 242 which will reduce the resistance of the spin valve sensor to the sense current $I_S$ and when a signal field rotates the magnetic moment 214 downwardly out of the spin valve sensor the magnetic moment 214 becomes more antiparallel with respect to the magnetic moments 240 and 242 which will increase the resistance of the spin valve sensor to the sense current $I_S$. These changes in resistances are processed as playback signals by the processing circuitry 50 in FIG. 3.

Figure 13:
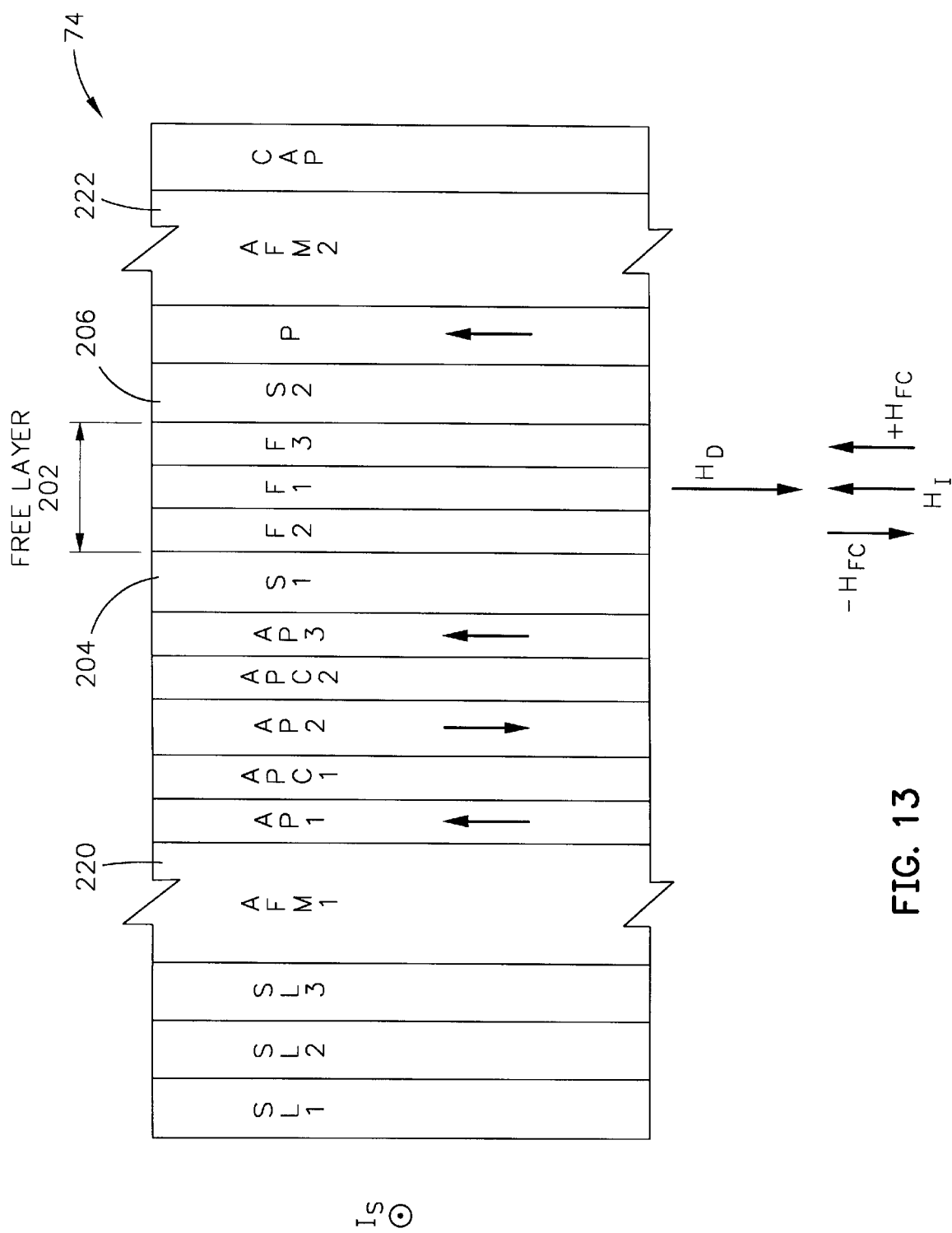
FIG. 13 is a view from left end of FIG. 12 rotated 90° clockwise.
Figure 14:
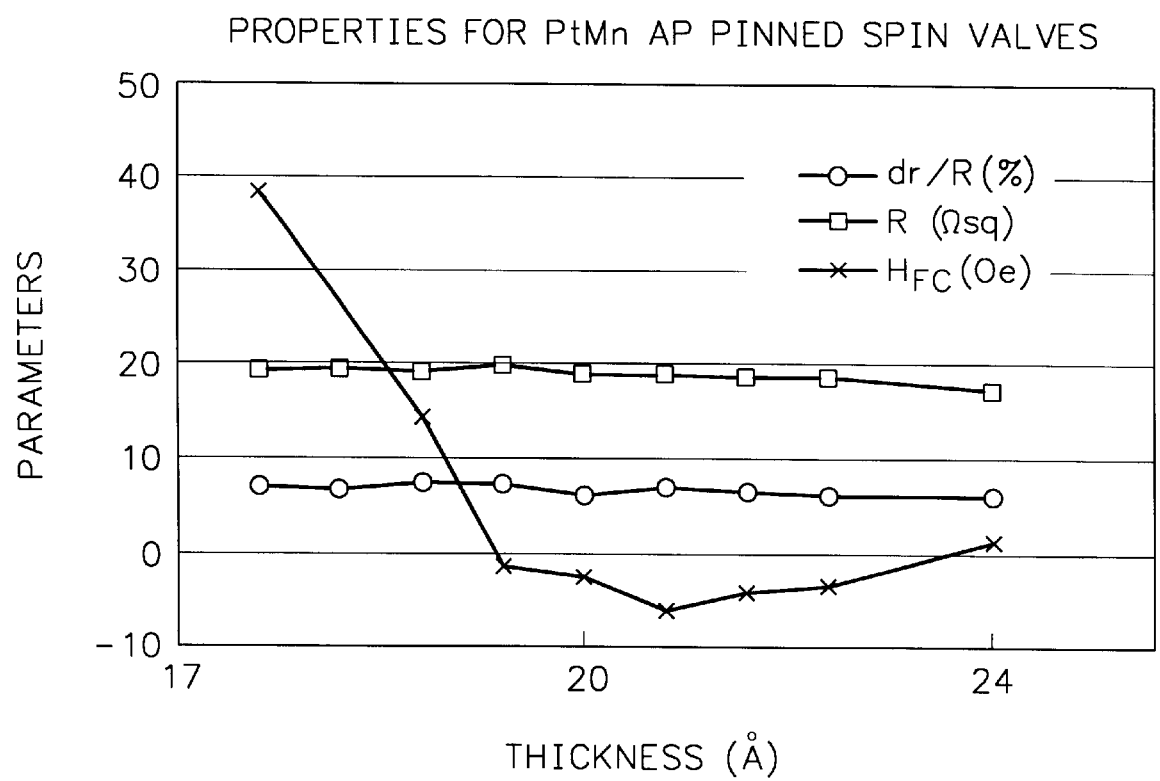
FIG. 14 is a graph of various parameters versus thicknesses of a copper (Cu) spacer layer for an AP pinned layer spin valve sensor.

Each of the third AP pinned layer 230 and the pinned layer 218 exert a ferromagnetic coupling field $H_{FC}$ on the free layer 202. The ferromagnetic coupling field is positive if it is in the same direction as the magnetic moments 240 and 242 and is negative if it is antiparallel thereto. In one embodiment of the invention the ferromagnetic coupling field exerted by the third AP pinned layer 230 is negative on the free layer 202. This is accomplished by making the first pinning layer 220 of platinum manganese (PtMn) and providing first, second and third seed layers (SL1, SL2 and SL3) 244, 246 and 248. The first seed layer 244 may be 30 Å of aluminum oxide ($Al_2O_3$), the second seed layer 246 may be 30 Å of nickel manganese oxide (NiMnO) and the third seed layer 248 may be 30 Å of tantalum (Ta). The first seed layer 244 may be located on the first read gap layer 148 in FIG. 11 or may be part thereof. FIG. 14 is a graph of various parameters of AP pinned spin valves with a platinum manganese pinning layer for various thicknesses of a copper spacer layer. The various parameters are magnetoresistive coefficient dr/R, resistance of the sensor R and ferromagnetic coupling field $H_{FC}$. It can be seen from the graph that when the thickness of the spacer layer is between about 19.5 Å to 24 Å that the ferromagnetic coupling field is negative. Accordingly, when the first spacer layer 204 is 21 Å of copper (Cu) one of the ferromagnetic coupling fields will be approximately −6 Oe, and when the second spacer layer 206 is 19 Å the other ferromagnetic coupling field will be approximately +6 Oe. A balancing of the fields with this arrangement is shown in FIG. 13 wherein the ferromagnetic coupling fields are antiparallel and the net demagnetizing field $H_D$) opposes a net sense current field $H_1$. It should be understood that if the negative ferromagnetic coupling field is not necessary that either the thickness of the first spacer layer 204 may be less than 19.5 Å or, optionally, another material may be used for the first pinning layer 220, such as nickel manganese (NiMn) or iridium manganese (IrMn) which will cause a positive ferromagnetic coupling field without the seed layers 244, 246 and 248. With this arrangement the net demagnetizing field $H_D$ would oppose the net sense current field $H_1$ as well as the net ferromagnetic coupling field which is a combination of positive ferromagnetic coupling fields on each side of the fee layer 202.

In one embodiment of the invention the second AP pinned layer 228 has a magnetic thickness which is equal to a total of the magnetic thicknesses of the first and third AP pinned layers 226 and 230. With this arrangement the triple AP pinned layer structure 216 exerts no demagnetizing field on the free layer 202. The only demagnetizing field exerted on the free layer 202 is due to the pinned layer 218. With this arrangement, however, the magnetic spins of the pinning layers 220 and 222 will be set by an exterior field in the presence of heat sufficient to free the magnetic spins of the first and second pinning layers for rotation by the exterior field. As an example, an exterior field is directed perpendicular to and into the sensor in the presence of heat at a temperature of about 240° C. which will free the magnetic spins of platinum manganese (PtMn) for the first and second pinning layers 220 and 222. This temperature is slightly below the blocking temperature of 350° C. for platinum manganese. In another embodiment the second AP pinned layer has a magnetic thickness which is greater than the total of the thicknesses of the first and third AP pinned layers 226 and 230. With this arrangement a current pulse in a sense current circuit in the same direction as the sense current $I_S$ will orient the magnetic moments 238 and 242 in the directions shown in FIG. 12 so as to properly set the magnetic spins of the first and second pinning layers 220 and 222. It has been found that if the current pulse has a magnitude of about three times the pulse of the sense current that the temperatures of the first and second pinning layers 220 and 222 are sufficiently raised to free their magnetic spins for movement in response to sense current fields caused by the conductive layers of the spin valve sensor due to the current pulse being conducted therethrough.

It should be noted in all embodiments that the direction of the sense current $I_S$, as shown in FIG. 12, will support the orientation of the magnetic moment 242 of the pinned layer 218. This is due to the fact that the conductive layers below the pinned layer 218 exert sense current fields on the pinned layer 218 in the direction of the magnetic moment 242 when the sense current $I_S$ is conducted through these conductive layers. Accordingly, this promotes thermal stability of the spin valve sensor when it is subjected to transient fields in the presence of elevated temperatures, such as when the spin valve sensor encounters an asperity on the rotating magnetic disk which raises its temperature to free the magnetic spins of the pinning layer.

Discussion

Exemplary thicknesses for the first, second and third AP pinned layers 226, 228 and 230 in the first embodiment are 20 Å of cobalt iron (CoFe) for the second AP pinned layer 228 and 10 521 of cobalt iron (CoFe) for each of the first and third AP pinned layers 226 and 230. The exemplary thicknesses for the first, second and third AP pinned layers 226, 228 and 230 in the second embodiment is the same as the first embodiment except the thickness of the second AP pinned layer 228 is larger, such as 24 Å. With this arrangement a pulse current in the sense current circuit in the same direction as $I_S$ in FIG. 12 will cause the conductive layers of the spin valve sensor to exert sense current fields on the second AP pinned layer 228 to orient the magnetic moment 238 in the direction, as shown in FIG. 12, which overpowers the magnetic moments 236 and 240 and causes them to be antiparallel thereto. The orientation of the magnetic moment 236 orients the magnetic spins of the pinning layer 220. It should be understood that cobalt (Co) may be substituted for cobalt iron (CoFe) for the various cobalt based layers of the sensor. Further, if the sense current $I_S$ in FIG. 12 is oriented from left to right instead of from right to left the magnetic moments 236, 238 and 240 of the triple AP pinned layer structure and the magnetic moment 242 of the pinned layer 218 will be reversed in their directions. The magnetic moment 214 of the free layer may remain in the same direction or may be reversed, as desired.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
    a spin valve sensor including:
        a ferromagnetic free layer;
        a triple antiparallel (AP) pinned layer structure;
        a pinned layer;
        a nonmagnetic conductive first spacer layer between the triple AP pinned layer structure and the free layer and a nonmagnetic conductive second spacer layer between the free layer and the pinned layer;
        an antiferromagnetic first pinning layer exchange coupled to the triple AP pinned layer structure for pinning a magnetic moment of the triple AP pinned layer structure in a first direction;
        an antiferromagnetic second pinning layer exchange coupled to the pinned layer for pinning a magnetic moment of the pinned layer in a second direction; and
        the triple AP pinned layer structure including:
            ferromagnetic first, second and third AP pinned layers;
            first and second AP coupling layers; and
            the second AP pinned layer being located between the first and second AP coupling layers and the first and second AP coupling layers being located between the first and third AP pinned layers;
    a net demagnetizing field, a net ferromagnetic coupling field and a net sense current field being exerted on the free layer wherein the net demagnetizing field is due to a demagnetizing field from the pinned layer or the pinned layer and the AP pinned layer structure, the net ferromagnetic coupling field is a combination of ferromagnetic coupling fields exerted by the pinned layer and the third AP pinned layer and the net sense current field is a combination of sense current fields from conductive layers on each side of the free layer when a sense current is conducted through the spin valve sensor; and
    the net demagnetizing field being counterbalanced by the net sense current field and the net ferromagnetic coupling field.

2. A magnetic read head as claimed in claim 1 including:
nonmagnetic insulative first and second read gap layers;
the spin valve sensor being located between the first and second read gap layers;
ferromagnetic first and second shield layers; and
the first and second read gap layers being located between the first and second shield layers.

3. A magnetic read head as claimed in claim 2 including:
each of the first, second and third AP pinned layers having a magnetic thickness with the magnetic thicknesses of the first and third AP pinned layers being equal and a total of the magnetic thicknesses of the first and third AP pinned layers being less than the magnetic thickness of the second AP pinned layer.

4. A magnetic read head as claimed in claim 3 including:
a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;
the first pinning layer being composed of platinum manganese (PtMn) and located directly on the third seed layer; and
the first spacer having a thickness which causes the third AP pinned layer to exert a negative ferromagnetic coupling field on the free layer.

5. A magnetic read head as claimed in claim 1 including:
each of the first, second and third AP pinned layers having a magnetic thickness with the magnetic thicknesses of the first and third AP pinned layers being equal and a total of the magnetic thicknesses of the first and third AP pinned layers being equal to the magnetic thickness of the second AP pinned layer.

6. A magnetic read head as claimed in claim 5 including:
a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;

the first pinning layer being composed of platinum manganese (PtMn) and located directly on the third seed layer; and the first spacer having a thickness which causes the third AP pinned layer to exert a negative ferromagnetic coupling field on the free layer.

7. A magnetic head assembly, having an air bearing surface (ABS), comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

a read head including:
a spin valve sensor;
nonmagnetic insulative first and second read gap layers;
the spin valve sensor being located between the first and second read gap layers;
a ferromagnetic first shield layer; and
the first and second read gap layers being located between the first shield layer and the first pole piece layer;

the spin valve sensor including:
a ferromagnetic free layer;
a triple antiparallel (AP) pinned layer structure;
a pinned layer;
a nonmagnetic conductive first spacer layer between the triple AP pinned layer structure and the free layer and a nonmagnetic conductive second spacer layer between the free layer and the pinned layer;
an antiferromagnetic first pinning layer exchange coupled to the triple AP pinned layer structure for pinning a magnetic moment of the triple AP pinned layer structure in a first direction;
an antiferromagnetic second pinning layer exchange coupled to the pinned layer for pinning a magnetic moment of the pinned layer in a second direction; and
the triple AP pinned layer structure including:
ferromagnetic first, second and third AP pinned layers;
first and second AP coupling layers; and
the second AP pinned layer being located between the first and second AP coupling layers and the first and second AP coupling layers being located between the first and third AP pinned layers;
a net demagnetizing field, a net ferromagnetic coupling field and a net sense current field being exerted on the free layer wherein the net demagnetizing field is due to a demagnetizing field from the pinned layer or the pinned layer and the AP pinned layer structure, the net ferromagnetic coupling field is a combination of ferromagnetic coupling fields exerted by the pinned layer and the third AP pinned layer and the net sense current field is a combination of sense current fields from conductive layers on each side of the free layer when a sense current is conducted through the spin valve sensor; and
the net demagnetizing field being counterbalanced by the net sense current field and the net ferromagnetic coupling field.

8. A magnetic head assembly as claimed in claim 7 including:
a second shield layer;
the first and second read gap layers being located between the first and second shield layers; and
a nonmagnetic insulative isolation layer located between the second shield layer and the first pole piece layer.

9. A magnetic head assembly as claimed in claim 8 including:
a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;
the first pinning layer being composed of platinum manganese (PtMn) and located directly on the third seed layer; and
the first spacer having a thickness which causes the third AP pinned layer to exert a negative ferromagnetic coupling field on the free layer.

10. A magnetic head assembly as claimed in claim 7 including:
each of the first, second and third AP pinned layers having a magnetic thickness with the magnetic thicknesses of the first and third AP pinned layers being equal and a total of the magnetic thicknesses of the first and third AP pinned layers being equal to the magnetic thickness of the second AP pinned layer.

11. A magnetic head assembly as claimed in claim 7 including:
a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;
the first pinning layer being composed of platinum manganese (PtMn) and located directly on the third seed layer; and
the first spacer having a thickness which causes the third AP pinned layer to exert a negative ferromagnetic coupling field on the free layer.

12. A magnetic head assembly as claimed in claim 11 including:
each of the first, second and third AP pinned layers having a magnetic thickness with the magnetic thicknesses of the first and third AP pinned layers being equal and a total of the magnetic thicknesses of the first and third AP pinned layers being less than the magnetic thickness of the second AP pinned layer.

13. A magnetic disk drive, including at least one magnetic head assembly wherein the magnetic head assembly has an air bearing surface (ABS), comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and the first and second pole piece layers being connected at their back gap portions;
a read head including:
  a spin valve sensor:
    nonmagnetic insulative first and second read gap layers;
    the spin valve sensor being located between the first and second read gap layers;
    ferromagnetic first and second shield layers; and
    the first and second read gap layers being located between the first and second shield layers;
the spin valve sensor including:
  a ferromagnetic free layer;
  a triple antiparallel (AP) pinned layer structure;
  a pinned layer;
  a nonmagnetic conductive first spacer layer between the triple AP pinned layer structure and the free layer and a nonmagnetic conductive second spacer layer between the free layer and the pinned layer;
  an antiferromagnetic first pinning layer exchange coupled to the triple AP pinned layer structure for pinning a magnetic moment of the triple AP pinned layer structure in a first direction;
  an antiferromagnetic second pinning layer exchange coupled to the pinned layer for pinning a magnetic moment of the pinned layer in a second direction; and
  the triple AP pinned layer structure including:
    ferromagnetic first, second and third AP pinned layers;
    first and second AP coupling layers; and
    the second AP pinned layer being located between the first and second AP coupling layers and the first and second AP coupling layers being located between the first and third AP pinned layers;
  a net demagnetizing field, a net ferromagnetic coupling field and a net sense current field being exerted on the free layer wherein the net demagnetizing field is due to a demagnetizing field from the pinned layer or the pinned layer and the AP pinned layer structure, the net ferromagnetic coupling field is a combination of ferromagnetic coupling fields exerted by the pinned layer and the third AP pinned layer and the net sense current field is a combination of sense current fields from conductive layers on each side of the free layer when a sense current is conducted through the spin valve sensor; and
  the net demagnetizing field being counterbalanced by the net sense current field and the net ferromagnetic coupling field;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head, for controlling movement of the magnetic disk and for controlling the position of the magnetic head.

14. A magnetic disk drive as claimed in claim 13 including:
  a nonmagnetic insulative isolation layer located between the second shield layer and the first pole piece layer.

15. A magnetic disk drive as claimed in claim 14 including:
  each of the first, second and third AP pinned layers having a magnetic thickness with the magnetic thicknesses of the first and third AP pinned layers being equal and a total of the magnetic thicknesses of the first and third AP pinned layers being less than the magnetic thickness of the second AP pinned layer.

16. A magnetic disk drive as claimed in claim 14 including:
  a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;
  the first pinning layer being composed of platinum manganese (PtMn) and located directly on the third seed layer; and
  the first spacer having a thickness which causes the third AP pinned layer to exert a negative ferromagnetic coupling field on the free layer.

17. A magnetic disk drive as claimed in claim 13 including:
  each of the first, second and third AP pinned layers having a magnetic thickness with the magnetic thicknesses of the first and third AP pinned layers being equal and a total of the magnetic thicknesses of the first and third AP pinned layers being equal to the magnetic thickness of the second AP pinned layer.

18. A magnetic disk drive as claimed in claim 13 including:
  a first seed layer composed of aluminum oxide ($Al_2O_3$), a second seed layer composed of nickel manganese oxide (NiMnO) directly on the first seed layer, a third seed layer composed of tantalum (Ta) directly on the second seed layer;
  the first pinning layer being composed of platinum manganese (PtMn) and located directly on the third seed layer; and
  the first spacer having a thickness which causes the third AP pinned layer to exert a negative ferromagnetic coupling field on the free layer.

19. A method of making a magnetic read head comprising:
  making a spin valve sensor comprising the steps of:
    forming a ferromagnetic free layer;
    forming a triple antiparallel (AP) pinned layer structure;
    forming a pinned layer;
    forming a nonmagnetic conductive first spacer layer between the triple AP pinned layer structure and the free layer and forming a nonmagnetic conductive second spacer layer between the free layer and the pinned layer;
    forming an antiferromagnetic first pinning layer exchange coupled to the triple AP pinned layer structure for pinning a magnetic moment of the triple AP pinned layer structure in a first direction;
    forming an antiferromagnetic second pinning layer exchange coupled to the pinned layer for pinning a magnetic moment of the pinned layer in a second direction; and a making of the triple AP pinned layer structure including the steps of:
forming ferromagnetic first, second and third AP pinned layers;
forming first and second AP coupling layers; and
the second AP pinned layer being formed between the first and second AP coupling layers and the first and second AP coupling layers being formed between the first and third AP pinned layers;
a net demagnetizing field, a net ferromagnetic coupling field and a net sense current field being exerted on the free layer wherein the net demagnetizing field is due to a demagnetizing field from the pinned layer or the pinned layer and the AP pinned layer structure, the net ferromagnetic coupling field is a combination of ferromagnetic coupling fields exerted by the pinned layer and the third AP pinned layer and the net sense current field is a combination of sense current fields from conductive layers on each side of the free layer when a sense current is conducted through the spin valve sensor; and
the net demagnetizing field being counterbalanced by the net sense current field and the net ferromagnetic coupling field.

20. A method of making a magnetic read head as claimed in claim 19 including:
forming nonmagnetic insulative first and second read gap layers with the spin valve sensor being formed between the first and second read gap layers; and
forming ferromagnetic first and second shield layers with the first and second read gap layers being formed between the first and second shield layers.

21. A method of making a magnetic read head as claimed in claim 20 including:
forming a first seed layer composed of aluminum oxide ($Al_2O_3$), forming a second seed layer composed of nickel manganese oxide (NiMnO) directly on the first seed layer, forming a third seed layer composed of tantalum (Ta) directly on the second seed layer;
forming the first pinning layer of platinum manganese (PtMn) and locating it directly on the third seed layer; and
forming the first spacer with a thickness which causes the first AP pinned layer structure to exert a negative ferromagnetic coupling field on the free layer.

22. A method of making a magnetic read head as claimed in claim 19 including:
forming each of the first, second and third AP pinned layers with a magnetic thickness with the magnetic thicknesses of the first and third AP pinned layers being equal and a total of the magnetic thicknesses of the first and third AP pinned layers being equal to the magnetic thickness of the second AP pinned layer.

23. A method of making a magnetic read head as claimed in claim 19 including:
forming a first seed layer composed of aluminum oxide ($Al_2O_3$), forming a second seed layer composed of nickel manganese oxide (NiMnO) directly on the first seed layer, forming a third seed layer composed of tantalum (Ta) directly on the second seed layer, forming the first pinning layer of platinum manganese (PtMn) and locating it directly on the third seed layer; and
forming the first spacer with a thickness which causes the first AP pinned layer structure to exert a negative ferromagnetic coupling field on the free layer.

24. A method of making a magnetic read head as claimed in claim 23 including:
forming each of the first, second and third AP pinned layers with a magnetic thickness with the magnetic thicknesses of the first and third AP pinned layers being equal and a total of the magnetic thicknesses of the first and third AP pinned layers being less than the magnetic thickness of the second AP pinned layer.

25. A method of making a magnetic head assembly, which has an air bearing surface (ABS), comprising the steps of:
making a write head comprising the steps of:
forming ferromagnetic first and second pole piece layers in pole tip, yoke and back regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and second pole piece layers at said back gap region;
making a read head comprising the steps of:
forming a spin valve sensor and nonmagnetic insulative first and second read gap layers with the spin valve sensor located between the first and second read gap layers; and
forming a ferromagnetic first shield layer with the first and second read gap layers located between the first shield layer and the first pole piece layer;
making the spin valve sensor comprising the steps of:
forming a ferromagnetic free layer;
forming a triple antiparallel (AP) pinned layer structure;
forming a pinned layer;
forming a nonmagnetic conductive first spacer layer between the triple AP pinned layer structure and the free layer and forming a nonmagnetic conductive second spacer layer between the free layer and the pinned layer;
forming an antiferromagnetic first pinning layer exchange coupled to the triple AP pinned layer structure for pinning a magnetic moment of the triple AP pinned layer structure in a first direction;
forming an antiferromagnetic second pinning layer exchange coupled to the pinned layer for pinning a magnetic moment of the pinned layer in a second direction; and
a making of the triple AP pinned layer structure including the steps of:
forming ferromagnetic first, second and third AP pinned layers;
forming first and second AP coupling layers; and
the second AP pinned layer being formed between the first and second AP coupling layers and the first and second AP coupling layers being formed between the first and third AP pinned layers;
a net demagnetizing field, a net ferromagnetic coupling field and a net sense current field being exerted on the free layer wherein the net demagnetizing field is due to a demagnetizing field from the pinned layer or the pinned layer and the AP pinned layer structure, the net ferromagnetic coupling field is a combination of ferromagnetic coupling fields exerted by the pinned layer and the third AP pinned layer and the net sense current field is a combination of sense current fields from conductive layers on each side of the free layer when a sense current is conducted through the spin valve sensor; and the net demagnetizing field being counterbalanced by the net sense current field and the net ferromagnetic coupling field.

26. A method of making a magnetic head assembly as claimed in claim 25 further comprising the steps of:

forming a second shield layer with the first and second read gap layers located between the first and second shield layers;

and forming a nonmagnetic insulative isolation layer with the isolation layer located between the second shield layer and the first pole piece layer.

27. A method of making a magnetic head assembly as claimed in claim 26 including:

forming a first seed layer composed of aluminum oxide ($Al_2O_3$), forming a second seed layer composed of nickel manganese oxide (NiMnO) directly on the first seed layer, forming a third seed layer composed of tantalum (Ta) directly on the second seed layer;

forming the first pinning layer of platinum manganese (PtMn) and locating it directly on the third seed layer; and forming the first spacer with a thickness which causes the first AP pinned layer structure to exert a negative ferromagnetic coupling field on the free layer.

28. A method of making a magnetic head assembly as claimed in claim 25 including:

forming each of the first, second and third AP pinned layers with a magnetic thickness with the magnetic thicknesses of the first and third AP pinned layers being equal and a total of the magnetic thicknesses of the first and third AP pinned layers being equal to the magnetic thickness of the second AP pinned layer.

29. A method of making a magnetic head assembly as claimed in claim 25 including: forming a first seed layer composed of aluminum oxide ($Al_2O_3$), forming a second seed layer composed of nickel manganese oxide (NiMnO) directly on the first seed layer, forming a third seed layer composed of tantalum (Ta) directly on the second seed layer;

forming the first pinning layer of platinum manganese (PtMn) and locating it directly on the third seed layer; and forming the first spacer with a thickness which causes the first AP pinned layer structure to exert a negative ferromagnetic coupling field on the free layer.

30. A method of making a magnetic head assembly as claimed in claim 29 including:

forming each of the first, second and third AP pinned layers with a magnetic thickness with the magnetic thicknesses of the first and third AP pinned layers being equal and a total of the magnetic thicknesses of the first and third AP pinned layers being less than the magnetic thickness of the second AP pinned layer.

31. A magnetic read head comprising:

a spin valve sensor including:
a ferromagnetic free layer;
a triple antiparallel (AP) pinned layer structure;
a pinned layer;
a nonmagnetic conductive first spacer layer between the triple AP pinned layer structure and the free layer and a nonmagnetic conductive second spacer layer between the free layer and the pinned layer;

an antiferromagnetic first pinning layer exchange coupled to the triple AP pinned layer structure for pinning a magnetic moment of the triple AP pinned layer structure in a first direction; and an antiferromagnetic second pinning layer exchange coupled to the pinned layer for pinning a magnetic moment of the pinned layer in a second direction; and the triple AP pinned layer structure including:
ferromagnetic first, second and third AP pinned layers;
first and second AP coupling layers;
the second AP pinned layer being located between the first and second AP coupling layers and the first and second AP coupling layers being located between the first and third AP pinned layers; and each of the first, second and third AP pinned layers having a magnetic thickness with a total of the magnetic thicknesses of the first and third AP pinned layers being equal to the magnetic thickness of the second AP pinned layer.

32. A magnetic head assembly, having an air bearing surface (ABS), comprising:

a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;

a read head including:
a spin valve sensor, nonmagnetic insulative first and second read gap layers;
the spin valve sensor being located between the first and second read gap layers;
a ferromagnetic first shield layer; and
the first and second read gap layers being located between the first shield layer and the first pole piece layer;

the spin valve sensor including:
a ferromagnetic free layer;
a triple antiparallel (AP) pinned layer structure;
a pinned layer;
a nonmagnetic conductive first spacer layer between the triple AP pinned layer structure and the free layer and a nonmagnetic conductive second spacer layer between the free layer and the pinned layer;

an antiferromagnetic first pinning layer exchange coupled to the triple AP pinned layer structure for pinning a magnetic moment of the triple AP pinned layer structure in a first direction; and an antiferromagnetic second pinning layer exchange coupled to the pinned layer for pinning a magnetic moment of the pinned layer in a second direction; and the triple AP pinned layer structure including:
ferromagnetic first, second and third AP pinned layers;
first and second AP coupling layers;
the second AP pinned layer being located between the first and second AP coupling layers and the first and second AP coupling layers being located between the first and third AP pinned layers; and each of the first, second and third AP pinned layers having a magnetic thickness with the magnetic thicknesses of the first and third AP pinned layers being equal and a total of the magnetic thicknesses of the first and third AP pinned layers being equal to the magnetic thickness of the second AP pinned layer.

33. A magnetic disk drive comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   a read head including:
      a spin valve sensor:
      nonmagnetic insulative first and second read gap layers;
      the spin valve sensor being located between the first and second read gap layers;
      ferromagnetic first and second shield layers; and
      the first and second read gap layers being located between the first and second shield layers;
   the spin valve sensor including:
      a ferromagnetic free layer;
      a triple antiparallel (AP) pinned layer structure;
      a pinned layer;
      a nonmagnetic conductive first spacer layer between the triple AP pinned layer structure and the free layer and a nonmagnetic conductive second spacer layer between the free layer and the pinned layer;
      an antiferromagnetic first pinning layer exchange coupled to the triple AP pinned layer structure for pinning a magnetic moment of the triple AP pinned layer structure in a first direction; and
      an antiferromagnetic second pinning layer exchange coupled to the pinned layer for pinning a magnetic moment of the pinned layer in a second direction; and
   the triple AP pinned layer structure including:
      ferromagnetic first, second and third AP pinned layers;
      first and second AP coupling layers;
      the second AP pinned layer being located between the first and second AP coupling layers and the first and second AP coupling layers being located between the first and third AP pinned layers;
   each of the first, second and third AP pinned layers having a magnetic thickness with a total of the magnetic thicknesses of the first and third AP pinned layers being equal to the magnetic thickness of the second AP pinned layer; and
   a housing;
   a magnetic disk rotatably supported in the housing;
   a support mounted in the housing for supporting the magnetic head assembly with said facing the magnetic disk so that the magnetic head assembly is in a transducing relationship with the magnetic disk;
   a spindle motor for rotating the magnetic disk;
   an actuator positioning means connected to the support for moving the magnetic head to multiple positions with respect to said magnetic disk; and
   a processor connected to the magnetic head, to the spindle motor and to the actuator for exchanging signals with the magnetic head, for controlling movement of the magnetic disk and for controlling the position of the magnetic head.

34. A method of making a magnetic read head comprising:
   making a spin valve sensor comprising the steps of:
      forming a ferromagnetic free layer;
      forming a triple antiparallel (AP) pinned layer structure;
      forming a pinned layer;
      forming a nonmagnetic conductive first spacer layer between the triple AP pinned layer structure and the free layer and forming a nonmagnetic conductive second spacer layer between the free layer and the pinned layer;
      forming an antiferromagnetic first pinning layer exchange coupled to the triple AP pinned layer structure for pinning a magnetic moment of the triple AP pinned layer structure in a first direction; and
      forming an antiferromagnetic second pinning layer exchange coupled to the pinned layer for pinning a magnetic moment of the pinned layer in a second direction; and
   a making of the triple AP pinned layer structure including the steps of:
      forming ferromagnetic first, second and third AP pinned layers;
      forming first and second AP coupling layers;
      the second AP pinned layer being formed between the first and second AP coupling layers and the first and second AP coupling layers being formed between the first and third AP pinned layers; and
      forming each of the first, second and third AP pinned layers with a magnetic thickness with a total of the magnetic thicknesses of the first and third AP pinned layers being equal to the magnetic thickness of the second AP pinned layer.

35. A method of making a magnetic head assembly, which has an air bearing surface (ABS), comprising the steps of
   making a write head comprising the steps of:
      forming ferromagnetic first and second pole piece layers in pole tip, yoke and back regions wherein the yoke region is located between the pole tip and back gap regions;
      forming a nonmagnetic nonconductive write gap layer between the first and second pole piece layers in the pole tip region;
      forming an insulation stack with at least one coil layer embedded therein between the first and second pole piece layers in the yoke region; and
      connecting the first and second pole piece layers at said back gap region;
   making a read head comprising the steps of:
      forming a spin valve sensor and nonmagnetic insulative first and second read gap layers with the spin valve sensor located between the first and second read gap layers; and
      forming a ferromagnetic first shield layer with the first and second read gap layers located between the first shield layer and the first pole piece layer;
   making the spin valve sensor comprising the steps of:
      forming a ferromagnetic free layer;
      forming a triple antiparallel (AP) pinned layer structure;
      forming a pinned layer;
      forming a nonmagnetic conductive first spacer layer between the triple AP pinned layer structure and the free layer and forming a nonmagnetic conductive second spacer layer between the free layer and the pinned layer;

forming an antiferromagnetic first pinning layer exchange coupled to the triple AP pinned layer structure for pinning a magnetic moment of the triple AP pinned layer structure in a first direction; and forming an antiferromagnetic second pinning layer exchange coupled to the pinned layer for pinning a magnetic moment of the pinned layer in a second direction; and a making of the triple AP pinned layer structure including the steps of:

forming ferromagnetic first, second and third AP pinned layers;

forming first and second AP coupling layers;

the second AP pinned layer being formed between the first and second AP coupling layers and the first and second AP coupling layers being formed between the first and third AP pinned layers; and forming each of the first, second and third AP pinned layers with a magnetic thickness with a total of the magnetic thicknesses of the first and third AP pinned layers being equal to the magnetic thickness of the second AP pinned layer.

* * * * *